(12) United States Patent
Wiersma et al.

(10) Patent No.: US 12,108,194 B2
(45) Date of Patent: Oct. 1, 2024

(54) IMAGING SYSTEMS AND METHODS

(71) Applicant: Snap Inc., Santa Monica, CA (US)

(72) Inventors: Joshua T. Wiersma, Phoenix, AZ (US);
Howard V. Goetz, Tigard, OR (US);
Edmund Passon, Scottsdale, AZ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/493,598

(22) PCT Filed: Mar. 16, 2018

(86) PCT No.: PCT/IB2018/000455
§ 371 (c)(1),
(2) Date: Sep. 12, 2019

(87) PCT Pub. No.: WO2018/167574
PCT Pub. Date: Sep. 20, 2018

(65) Prior Publication Data
US 2020/0195895 A1     Jun. 18, 2020

Related U.S. Application Data

(60) Provisional application No. 62/473,307, filed on Mar. 17, 2017.

(51) Int. Cl.
*H04N 9/31* (2006.01)
*G03H 1/26* (2006.01)

(52) U.S. Cl.
CPC ............ *H04N 9/312* (2013.01); *G03H 1/26* (2013.01); *H04N 9/3111* (2013.01); *H04N 9/3161* (2013.01); *G03H 2225/32* (2013.01)

(58) Field of Classification Search
CPC ............ H04N 9/31–3197; G03H 1/26; G03H 2225/32; G02F 2203/50; G02F 1/292; G02F 1/1313
See application file for complete search history.

(56) References Cited

U.S. PATENT DOCUMENTS 6,259,501 B1    7/2001   Yaniv
7,728,922 B2 *  6/2010   Hirota ............... G02F 1/133514
                                                  359/260

(Continued)

FOREIGN PATENT DOCUMENTS

CN    101443693    5/2009
CN    101563659    10/2009

(Continued)

OTHER PUBLICATIONS

International Search Report for PCT/IB2018/000455 mailed Jul. 23, 2018 enclosed herewith (5 pages).

(Continued)

*Primary Examiner* — Roberto W Flores
(74) *Attorney, Agent, or Firm* — Schwegman Lundberg & Woessner, P.A.

(57) ABSTRACT

An imaging system can include a segmented modulator, for example, a spatial light modulator, that is segmented into two or more equally or differently sized regions, and utilized to create a 3D, pseudo 3D, hologram, pseudo hologram, holographic, or pseudo holographic image. A voltage control unit is coupled to the spatial light modulator and controls voltages across each of the regions, wherein the voltage across one of the regions differs from the voltage across another one of the regions.

19 Claims, 11 Drawing Sheets

(56) References Cited

U.S. PATENT DOCUMENTS

| | | | |
|---|---|---|---|
| 2003/0228154 A1 | 12/2003 | Kiser et al. | |
| 2004/0252261 A1 | 12/2004 | Wen et al. | |
| 2005/0128371 A1* | 6/2005 | Ueda | C09K 19/56 349/33 |
| 2006/0181682 A1 | 8/2006 | Miller | |
| 2008/0151160 A1* | 6/2008 | Wang | G02F 1/133555 349/114 |
| 2012/0320292 A1 | 12/2012 | Guo et al. | |
| 2013/0265622 A1 | 10/2013 | Christmas et al. | |
| 2014/0118806 A1 | 5/2014 | Crossland et al. | |
| 2015/0243224 A1* | 8/2015 | Zhuang | G09G 3/3406 345/102 |
| 2015/0346491 A1 | 12/2015 | Christmas et al. | |
| 2017/0082855 A1* | 3/2017 | Christmas | G03H 1/2294 |

FOREIGN PATENT DOCUMENTS

| | | |
|---|---|---|
| CN | 105954993 A | 9/2016 |
| CN | 106030389 | 10/2016 |
| CN | 110431477 A | 11/2019 |
| EP | 0679036 | 10/1995 |
| EP | 3596537 A1 | 1/2020 |
| WO | WO-2016152323 A1 | 9/2016 |
| WO | WO-2018167574 A1 | 9/2018 |
| WO | WO-2018167574 A4 | 11/2018 |

OTHER PUBLICATIONS

Office Action dated Mar. 25, 2021 in related EP Application No. 18729744.5, 8 pages.

"Chinese Application Serial No. 201880018141.2, Office Action mailed Nov. 10, 2021", w/ English Translation, 25 pgs.

"European Application Serial No. 18729744.5, Communication Pursuant to Article 94(3) EPC mailed Mar. 25, 2021", 9 pgs.

"International Application Serial No. PCT/IB2018/000455, International Preliminary Report on Patentability mailed Sep. 26, 2019", 9 pgs.

"International Application Serial No. PCT/IB2018/000455, International Search Report mailed Jul. 23, 2018", 5 pgs.

"International Application Serial No. PCT/IB2018/000455, Written Opinion mailed Jul. 23, 2018", 7 pgs.

"Chinese Application Serial No. 201880018141.2, Decision of Rejection mailed Nov. 23, 2022", W/ English Translation, 11 pgs.

"Chinese Application Serial No. 201880018141.2, Office Action mailed Jun. 22, 2022", W/English Translation, 17 pgs.

"Chinese Application Serial No. 201880018141.2, Response filed May 25, 2022 to Office Action mailed Nov. 10, 2021", w/o English claims, 3 pgs.

"Chinese Application Serial No. 201880018141.2, Response filed Nov. 4, 2022 to Office Action mailed Jun. 22, 2022", w/ English claims, 11 pgs.

"European Application Serial No. 18729744.5, Communication Pursuant to Article 94(3) EPC mailed Aug. 9, 2022", 12 pgs.

"European Application Serial No. 18729744.5, Response filed Jan. 10, 2021 to Communication Pursuant to Article 94(3) EPC mailed Mar. 25, 2021", 15 pgs.

"European Application Serial No. 18729744.5, Response to Communication pursuant to Rules 161(1) and 162 EPC filed Apr. 30, 2020", 13 pgs.

Shi Jiacheng, et al., "Spatial multiplexing holographic combiner for glasses-free augmented reality", (Apr. 20, 2020), 3003-3010.

"European Application Serial No. 18729744.5, Response filed Jan. 5, 2023 to Communication Pursuant to Article 94(3) EPC mailed Aug. 9, 2022", 66 pgs.

Zhang Zichen, et al., "Fundamentals of phase-only liquid crystal on silicon (LCOS) devices".

"European Application Serial No. 18729744.5, Communication Pursuant to Article 94(3) EPC mailed Sep. 20, 2023", 6 pgs.

* cited by examiner

IMAGING SYSTEMS AND METHODS

CROSS-REFERENCE TO RELATED APPLICATIONS

This application claims priority to U.S. Provisional Application No. 62/473,307, entitled IMAGING SYSTEMS AND METHODS, and filed Mar. 17, 2017, the entire disclosure of which is incorporated by reference.

FIELD OF THE INVENTION

The present invention is directed to display systems and methods. More particularly, the present invention relates to systems and methods for forming one or more images utilizing a segmented display.

BACKGROUND OF THE INVENTION

Systems for displaying images may involve many components, for example light sources, displays, and optical devices. For wearable augmented and virtual reality systems, which generate images, the number of components is a significant factor in the design of such systems. In designing wearable systems, for example, the design objectives may include minimizing the size and weight of the devices or systems. In addition, when the number of components increases, the cost associated with developing such systems and devices may also increase, and the efficiency of the systems or devices may decrease. Also, as the number of components required for such systems or devices increases, the size and weight of the devices or systems may also increase.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE ILLUSTRATED EMBODIMENTS

Figure 1:
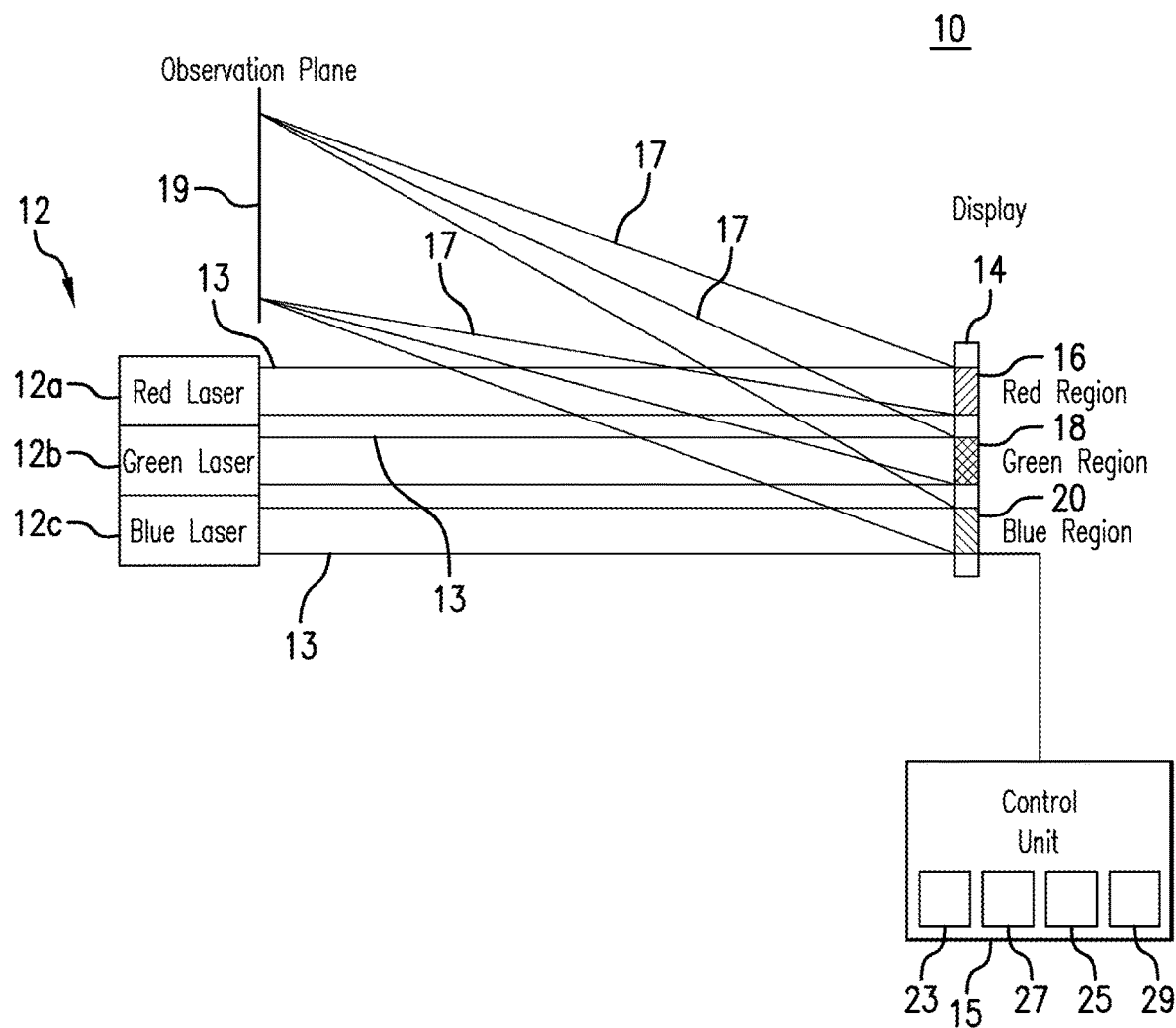
FIG. 1 illustrates a diagram of an imaging system in accordance with the present invention.

In the following detailed description, reference is made to the accompanying drawings which form a part hereof and in which are shown, by way of illustration, embodiments that may be practiced. It is to be understood that other embodiments may be utilized, and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

An imaging system 10, in accordance with the present invention, includes an electromagnetic radiation modulator (e.g., a light modulator, spatial light modulator and/or display) 14 that is segmented into at least two regions or segments. In an embodiment of the present invention, the electromagnetic radiation modulator 14 (e.g., a light modulator device) may be a phase-only light modulator. In an embodiment of the present invention, the electromagnetic radiation modulator 14 may be a display, for example, a liquid crystal-on-silicon (LCOS) display. In an embodiment of the present invention, the modulator 14 is any modulator in which the phase of incoming electromagnetic radiation (e.g., light) may be modulated. In other embodiments of the present invention, the phase modulating functions of a modulator 14, which modulates both phase and amplitude of electromagenetic radiation (e.g., light), may be utilized. In an embodiment of the present invention, the modulator 14 (e.g., a light modulator device) may modulate multiple characteristics of incoming electromagnetic radiation 13 (e.g., beamlets of light), for example, phase, amplitude, polarization and/or some other characteristic of incoming electromagnetic radiation (e.g., light).

In an embodiment of the present invention, the imaging system 10 may include one or more sources of electromagnetic radiation 12, for example one or more light sources 12a,12b,12c. Shown in FIG. 1 is an embodiment of an imaging system 10, in accordance with the present invention, that includes three sources of electromagnetic radiation 12a,12b,12c, for example, three light sources. In an embodiment of the present invention, the three light sources 12a, 12b,12c may include, for example, a source of red light, a source of green light, and a source of blue light. It should be understood by one of ordinary skill in the art that the number of sources of electromagnetic radiation 12a,12b,12c, for example, light sources may vary, and the wavelength of electromagnetic radiation (e.g., colors of light) output by the sources 12a,12b,12c may vary. For example, in an embodiment of an imaging system 10, in accordance with the present invention, a red source of light 12a may be directed to a red region 16 of the modulator, a green source of light 12b may be directed toward a green region of the light modulator 18, and a blue source of light 12c may be directed towards a blue region 20 of the modulator.

When electromagnetic radiation, for example, light is directed onto the modulator 14, the modulator 14 is utilized to modulate at least the phase of the incoming electromagnetic radiation (e.g., light). For example, as illustrated in FIG. 1, in an embodiment of the present invention, red light is received in the red region 16 of the light modulator 14, the phase of the red light is modulated in the red region 16 of the modulator, and a red image (e.g., phase image or hologram) is output from the modulator. In an embodiment of the present invention, green light is received in the green region 18 of the light modulator 14, the phase of the green light is modulated in the green region 18 of the modulator 14, and a green image is output from the modulator 14. In an embodiment of the present invention, blue light is received in the blue region 20 of the light modulator 14, the phase of the blue light is modulated in the blue region 20 of the modulator 14, and a blue image is output from the light modulator 14. In an embodiment of the present invention electromagnetic radiation (e.g., light) received at each region 16,18,20 of a modulator 14 may be simultaneously modulated or modulated at different times, by the modulator 14.

In an embodiment of the present invention, for example, the phase modulated red light corresponds to a red image (e.g., a red phase image) of an object, the phase modulated blue light corresponds to a blue image (e.g., a blue phase image) of the same object, and the green phase modulated light corresponds to a green image (e.g., a green phase image) of the same object. In an embodiment of the present invention, sources of electromagnetic radiation 12a,12b,12c may output electromagnetic radiation (e.g., light) of a same or similar wavelength or at least two different wavelengths.

In an embodiment of the present invention, an imaging system 10, in accordance with the present invention, may be utilized to generate or create the appearance of, for example, an image (e.g., a single color image, a multicolor image, and/or a hologram image) via the combination of multiple individual same or different color images (e.g., spatially multiplexed red, green, and blue images as shown in FIG. 1 or a spatially multiplexed single color image (for example, a single red image)) on an observation plane 19 (i.e., a real or imaginary observation plane). In an embodiment of the present invention, each region 16,18,20 may output an image (which may or may not differ in color from an image output from that of another region 16,18,20) at one or more different instances in time, and such image may be combined such that the images generated from each region 16,18,20 appear integrated to, for example, a human eye and/or other detector. In an embodiment of the present invention, the control unit 15 may control the operation of the modulator 14. In an embodiment of the present invention, the control unit 15 may control the timing of modulation operations, for example, phase modulation by each of the regions 16,18,20. In an embodiment of the present invention, the control unit 15 may include a timing circuit or device 29 that controls the timing of when each region 16,18,20 modulates a phase of incoming electromagnetic radiation (e.g., light). In an embodiment of the present invention, a modulator 14, in accordance with the present image, outputs, for example, an image (e.g., a color image and/or a hologram image) at the observation plane 19.

Figure 2:
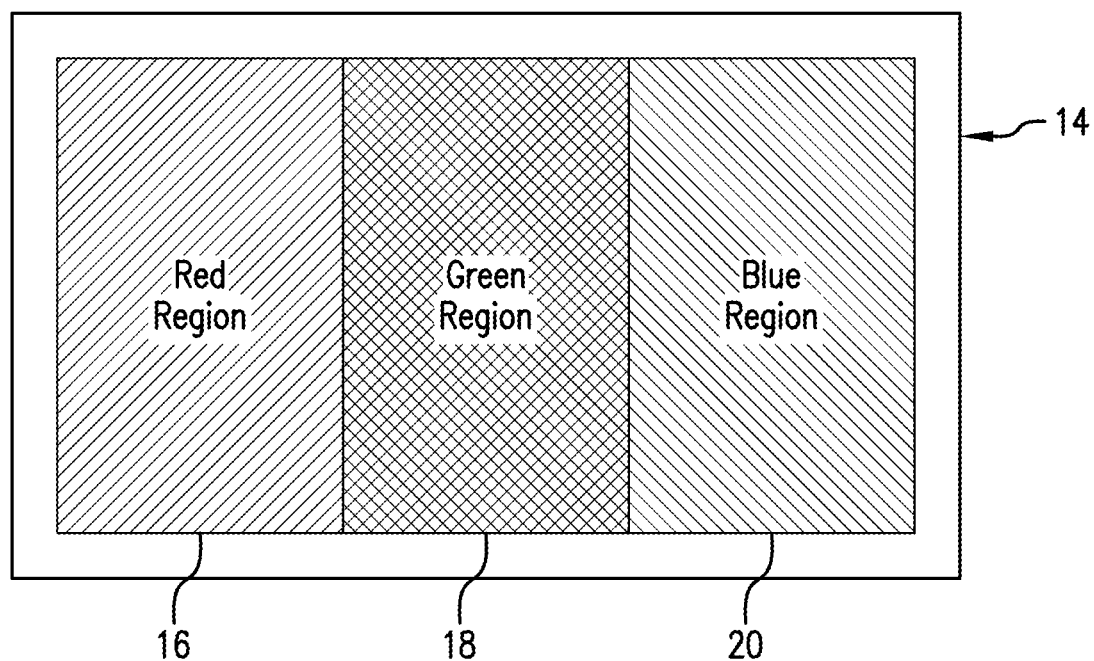
FIG. 2 illustrates a divided modulator in accordance with the present invention.

In an embodiment of the present invention, the source 12a of red light may be for example, a red laser, the source 12b of the green light may be a green laser, and/or a source 12c of the blue light may be a blue laser. In an embodiment of the present invention, a modulator 14, in accordance with the present invention, is divided into at least two segments or regions 16,18,20, of a same or different size. In an embodiment of the present invention, a modulator 14, as shown in FIG. 2, may have three regions 16,18,20, and the regions may be equal in size or substantially equal in size.

Figure 3:
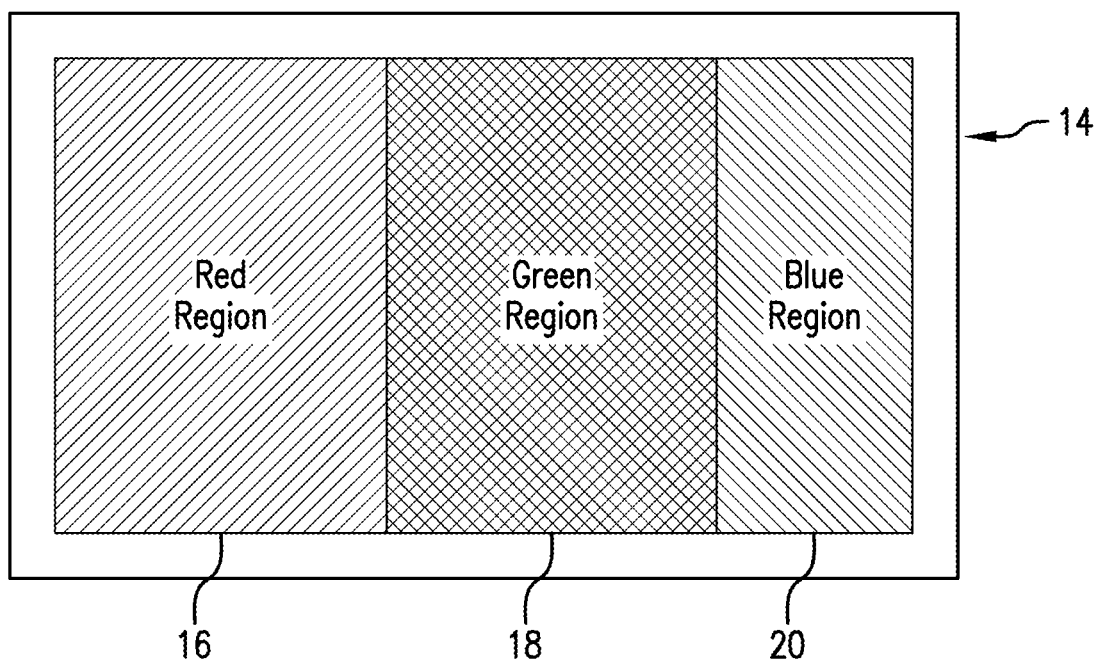
FIG. 3 illustrates an unequally divided modulator in accordance with the present invention.

In another embodiment of the present invention, as shown in FIG. 3, a modulator 14, in accordance with the present invention, may include two or more regions 16,18,20, and a size of one region 16,18,20 may differ from the size of one or more of the other regions 16,18,20. In an embodiment of the present invention, the regions 16,18,20 are not equal in size. As shown in FIG. 3, a modulator 14, in accordance with the present invention has three regions 16,18,20 and the regions 16,18,20 are not equal in size, as at least two of the regions 16,18,20 are not equal or substantially equal in size.

For example, in an embodiment of the present invention, as shown in FIG. 3, a blue region 20 may be smaller than another one or more regions 16,18 (e.g., the red and/or green regions 16,18, respectively). In an embodiment of the present invention, a region 20 of the modulator for generating the blue image is smaller than the other one or more regions for generating images of one or more other colors 16,18 (e.g., a region of the modulator for generating a red image and/or a region of the modulator for generating a green image). Humans are less adept at resolving blue images. By decreasing the size of the region 20 of the modulator for generating the blue image relative to one or more regions 16,18 for generating images of one or more other colors (e.g., red and/or green), the quality of the other colors (e.g., red and/or green) in the image improves, and thus, the quality of the overall image improves. It should be understood by one of ordinary skill in the art that the color of light corresponding to regions 16,18 may be colors other than red and/or green.

Figure 4A:
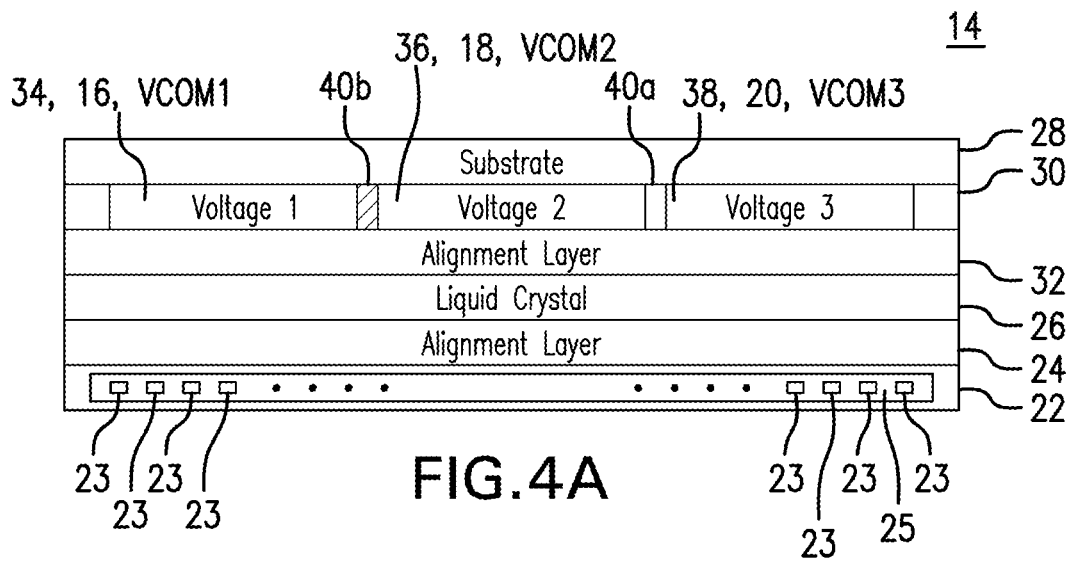
FIGS. 4A-4D illustrate modulators in accordance with the present invention.

As shown in FIG. 4A, a modulator 14 in accordance with the present invention, may include a first substrate 22, for example a silicon backplane that includes pixel elements 23 coupled to pixel circuitry 25, a first alignment layer 24, for example, an alignment layer over the backplane 22, a liquid crystal layer 26, a second substrate 28, for example a transparent substrate (e.g., a substrate made from a material that includes a transparent material such as plastic or glass), a conductive layer 30 over the second substrate (for example, the transparent substrate), and a second alignment layer 32 (e.g., an alignment layer over the conductive layer that is over the second substrate). One or more pixel elements 23 may be coupled to a pixel circuitry region 25a,25b,25c, in the pixel circuitry 25. In an embodiment of the present invention, the conductive layer 30 over the second substrate (e.g., the transparent substrate) is made from a transparent or substantially transparent and electrically conductive material or substance, for example, indium tin oxide (ITO). In an embodiment of the present invention, the second substrate 28 is a cover glass.

In an embodiment of a modulator 14, in accordance with the present invention, the modulator 14 may include two or more regions 16,18,20 which may have different voltages across them. In an embodiment of the present invention a modulator 14, in accordance with the present invention, may have separate and distinct voltage regions 34,36,38, such as variable voltage regions, and each voltage region has a voltage at the conductive layer 30 that may be referred to as VCOM1, VCOM2, and VCOM3, respectively, and each voltage region 34,36,38 may correspond to regions 16,18,20 of a modulator 14, as shown, for example, in FIG. 1. In an embodiment of the present invention, as shown in FIG. 4A, a conductive layer 30 over the second substrate 28 (e.g., the cover glass or transparent substrate) may be divided into regions or segments 34,36,38 where each region corresponds, for example, to regions 16,18,20 of modulator 14. In an embodiment of the present invention, the regions 34,36, 38 of the conductive layer 30 are at least electrically isolated. In an embodiment of the present invention, the regions 34,36,38 of the second substrate may be physically isolated, for example, isolated via a material, for example a gap, gasket, and/or device/divider 40. In an embodiment of the present invention a gap 40 may include an insulating material, at least in part, or may not include a material (see 40a that illustrates an example of a gap that does not include a material). In an embodiment of the present invention a divider or gasket 40 may be made from, at least in part, an insulating material (see 40b that illustrates a divider 40 made from a material). In an embodiment of the present invention, a thickness of a device/divider or a size of a gap 40 separating the regions 34,36,38 may be minimized to reduce electrical interference between the regions 34,36,38. In an exemplary embodiment of an imaging system, in accordance with the present invention, a modulator 14 may have two or more regions 34,36,38 that are independently, separately, and/or individually controlled regions. For example, in an embodiment of the present invention, as shown in FIG. 4A, the modulator 14 may include, for example, three regions, for example, three voltage regions 34,36,38, corresponding to regions 16,18,20, that may be separately, individually, and/or independently controlled. In an embodiment of the present invention, as the birefringence of liquid crystal varies as a function of wavelength, a voltage differential of each region 16,18,20, corresponding to regions 34,36,38, may be tuned by adjusting the voltage of the conductive layer 30 to maintain bit depth (e.g., maintain a number of modulation levels available, for example, phase modulations).

Figure 4B:
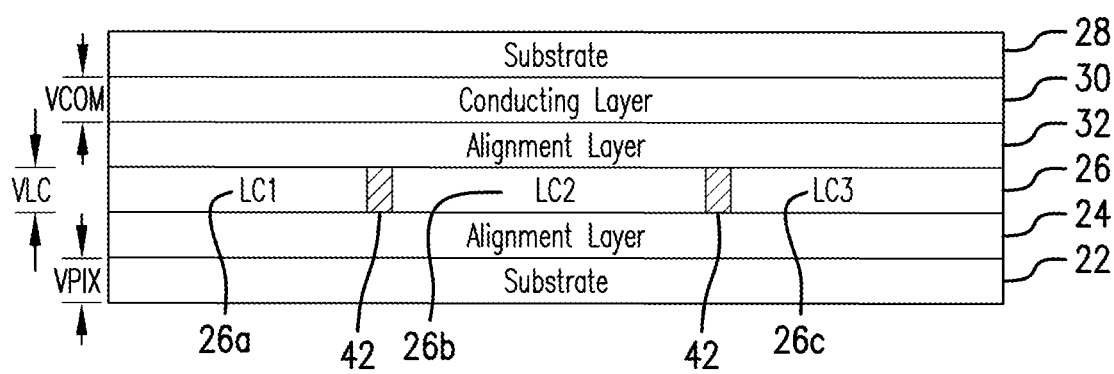

In an embodiment of the present invention, as shown in FIG. 4B, regions, corresponding to regions 16,18,20 of the modulator 14, in accordance with the present invention, may be created by, for example, utilizing an unsegmented conductive layer 30 and varying the type of liquid crystal material or substance (LC) utilized in two or more segments or regions 26a,26b,26c of a modulator 14. In an embodiment of the present invention, each different type of liquid crystal material 26 utilized in liquid crystal regions 26a,26b,26c causes the birefringence in the corresponding to liquid crystal regions 26a,26b,26c, respectively, to differ from each other, and such liquid crystal regions 26a,26b,26c correspond to regions 16,18,20 of the modulator 14, respectively.

In an embodiment of the present invention, in addition to varying the type of liquid crystal 26 utilized in a liquid crystal region 26a,26b,26c, a conducting layer 30 may also be divided into voltage regions 34,36,38, for example, as shown in FIG. 4A, such that the birefringence of the liquid crystal 26 in the liquid crystal regions 26a,26b,26c may also be controlled by, for example, varying one or more of the voltages in voltage regions 34,36,38 corresponding to regions 16,18,20 of the modulator 14 in accordance with the present invention.

In an embodiment of the present invention, devices/dividers 42 made from, for example, an insulating material or gaps, (which may or may not include a material, for example, an insulating material) and/or gaskets 42 may be positioned between adjacent liquid crystal regions 26a,26b, 26c to isolate one of the liquid crystal regions 26a,26b,26c from another one of the liquid crystal regions 26a,26b,26c. In an embodiment of the present invention a device/divider or gasket (i.e., an example of a device) 42 may be made from, at least in part, an insulating material. In an embodiment of the present invention a gasket 42b may be made from, at least in part, a material, for example, an insulating material. In an embodiment of the present invention, a liquid crystal region 26a,26b,26c may vary, for example, for each wavelength of electromagnetic radiation (e.g., light) modulated by the area of the modulator 14 corresponding to each liquid crystal region 26a,26b,26c. It should be understood by one of ordinary skill in the art that the number and size of liquid crystal regions 26a,26b,26c may vary.

In an embodiment of the present invention, a modulator 14, in accordance with the present invention, there may be at least two independently, separately, and/or individually controlled voltage regions 34,36,38 (corresponding to regions 16,18,20, respectively) and at least two liquid crystal regions 26a,26b,26c (corresponding to regions 16,18,20, respectively) that have different types of liquid crystal materials, where each voltage region 34,36,38 may be controlled by a control unit 15. Adjusting the voltage of each voltage region provides for the controlling, adjusting, or varying of the orientation of the liquid crystal material 26 in liquid crystal regions 26a,26b,26c, and thus, controlling the amount of modulation or retardation imparted on the electromagnetic radiation (e.g., light). Changing the liquid crystal 26 in the liquid crystal regions 26a,26b,26c provides for controlling, adjusting, or varying the birefringence of the respective liquid crystal material 26, and thus, controlling the amount of modulation or retardation imparted on the electromagnetic radiation (e.g., light).

Figure 4C:
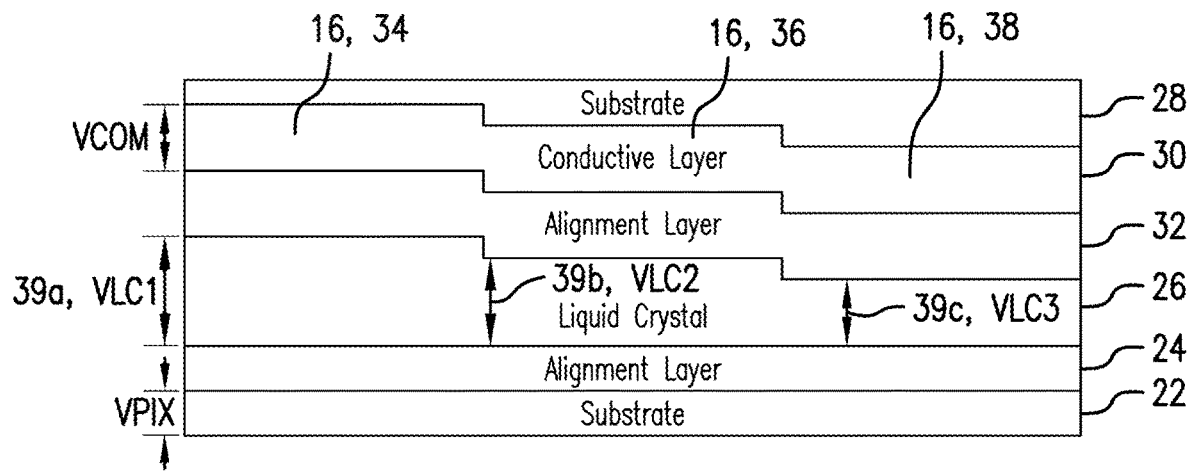

In an embodiment of the present invention, as shown in FIG. 4C, a modulator 14, in accordance with the present invention may have at least two regions that have cell gaps 39a,39b,39c that differ in thickness and correspond to regions 16,18,20 of the modulator 14, respectively (for example, correspond to at least two regions 16,18,20 of the modulator 14). The voltage across one or more of the cell gaps 39a,39b,39c correspond to VLC1, VLC2, and VLC3, respectively. In an embodiment of the present invention, at least two of the thicknesses of cell gaps 39a,39b,39c may differ, such that an amount of modulation (e.g., phase modulation) by at least two of the cell gaps 39a,39b,39c differs. The voltage across a cell gap VLC equals VCOM–VPIX. VCOM is a common voltage across a conductive layer 30 (or a voltage region 34,36,38, for example, as shown in FIG. 4A) and VPIX is a voltage of or applied to one or more pixels or a region of pixels). In an embodiment of the present invention, cell gap regions 39a,39b,39c, corresponding to regions 16,18,20, may or may not be defined by any spacing or physical structure between the cell gap regions 39a,39b,39c.

In an embodiment of a modulator 14, in accordance with the present invention, each of voltage regions 34,36,38 corresponding to cell gap regions 39a,39b,39c, and regions 16,18,20, respectively, may be independently, separately and/or individually controlled, and in addition to the varying one or more of the cell gap regions 39a,39b,39c. In an embodiment of the present invention, a cell gap region my vary, for example, for each wavelength of electromagnetic radiation (e.g., light) modulated by the region 16,18,20 of the modulator 14 corresponding to cell gap regions 39a,39b,39c. In an embodiment of the present invention, a modulator 14, in an accordance with the present invention, may include one or more voltage regions 34,36,38 that may be varied, and one or more liquid crystal regions 26, for example, liquid crystal regions 26a,26b,26c, that may have differing types of liquid crystal material 26, and at least two cell gap regions that have differing cell gap thicknesses.

In an embodiment of the present invention, the voltage across one or more voltage regions 34,36,38 may be changed, for each instance of data addressed to the modulator 14. In an embodiment of the present invention, a voltage level may be changed temporally across one or more of the regions 34,36,38, as shown in FIG. 1, of the modulator 14 (e.g., varying a voltage across one or more of the regions, for example, regions 34,36,38, during the generation of one or more bit planes addressing the modulator 14). Temporally changing the voltage across one or more segments 34,36,38 of the modulator 14 increases the ability to control an output of the modulator 14.

Figure 4D:
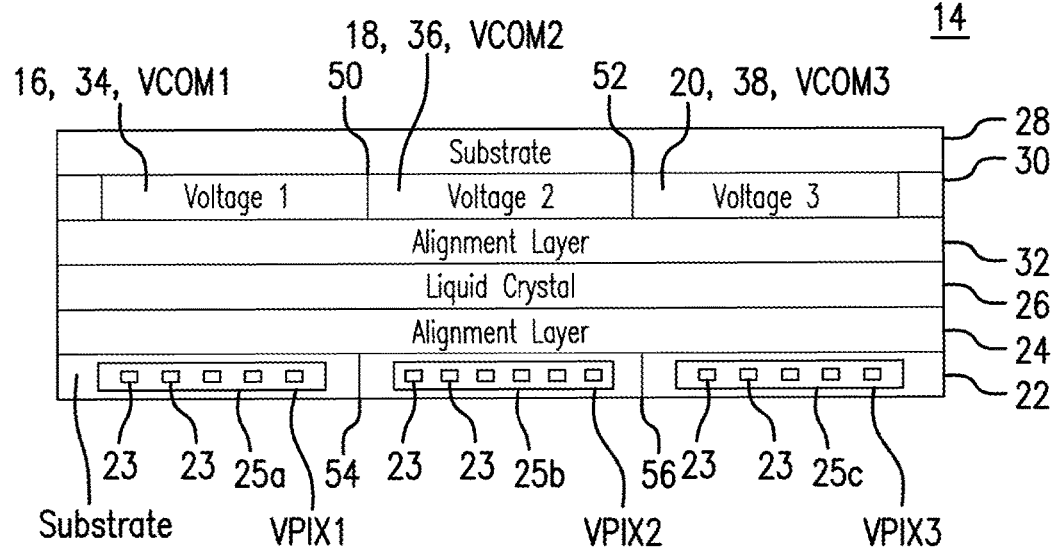

In cases where each region 34,36,38 modulates at least one wavelength of light that differs from that of another region 34,36,38, for example, as shown in FIG. 4D, it may be desirable that at least one of the regions 34,36,38 have a different range of voltages applied across the liquid crystal layer 26 than another one of the regions 34,36,38. As the birefringence of the liquid crystal 26 varies as a function of wavelength, maintaining a same range of phase-shift (for example 0-2π) for each of same or different wavelengths of electromagnetic radiation (corresponding to, for example, colors of light (e.g., three colors), may be accomplished, in an embodiment of the present invention, by varying, for example, one or more operating voltages associated with a region 16,18,20 (e.g., example, VCOM1,VCOM2,VCOM3 voltages (corresponding to voltages applied to three voltage regions 34,36,38). Maintaining a same range of phase-shift (for example 0-2π) for each of same or different wavelengths of electromagnetic radiation (corresponding to, for example, colors of light (e.g., three colors), may be accomplished, in an embodiment of the present invention, by varying, for example, at least two different VPIX voltages (e.g., VPIX1, VPIX2,VPIX3, corresponding to pixel circuitry regions 25a, 25b,25c, respectively). VPIX is a voltage of or applied to pixel circuitry regions 25a,25b,25c, (i.e., circuitry for controlling one or more pixel elements 23 in the respective pixel circuitry regions 25a,25b,25c). The pixel circuitry of the pixel circuitry regions 25a,25b,25c is coupled to, positioned on, and/or is embedded in a first substrate 22 (e.g., a silicon backplane). Such pixel circuitry 25 and/or pixel circuitry regions 25a,25b,25c may be referred to as on-chip pixel circuits or circuitry, which corresponds to, for example, regions of a modulator 14, in accordance with the present invention (e.g., regions 16,18,20 of modulator 14, for example, a light modulator, in accordance with the present invention). The timing of any of the voltages applied to any of the VCOM voltages or VPIX voltages may be varied, by for example a timing circuit or device 29. The timing device or circuit 29 may be internal to or external to control unit 15.

In an embodiment of the present invention, a modulator 14, in accordance with the present invention, has at least two pixel circuitry regions 25a,25b,25c that have different VPIX voltages. In an embodiment of the present invention, a control unit 15 may be utilized to control, for example, each of at least two of the VPIX voltages VPIX1,VPIX2,VPIX3, corresponding to each of the at least two pixel circuitry regions 25a,25b,25c, respectively. In an embodiment of the present invention, there may be a different voltage applied each pixel circuitry region 25a,25b,25c, for example, where each of the pixel circuitry regions 25a,25b,25c may correspond to a same or different wavelength of electromagnetic radiation (e.g., light) received at regions 16,18,20 of the modulator 14.

In an embodiment of a modulator 14, in accordance with the present invention, each pixel circuitry region 25a,25b, 25c may be electrically isolated from another one of the pixel circuitry regions 25a,25b,25c, via separate circuitry for each of the circuitry regions 25a,25b,25c; one or more gaps 44,46 positioned between adjacent circuitry regions 25a, 25b,25c, (where such gaps 44,46 may or may not have a material placed therebetween, e.g., an insulating material); and/or a divider or device 44,46 made from a material, for example an insulating material that extends at least partway through the first substrate 22 (e.g., silicon substrate).

In an embodiment of the present invention, a modulator 14, in accordance with the present invention, may have at least two separate voltage regions 34,36,38 that correspond to, for example, various colors of light received by a modulator 14, and a modulator 14 may have at least two pixel circuitry regions 25a,25b,25c, that correspond and align with at least two separate voltage regions 34,36,38, respectively.

Figure 4E:
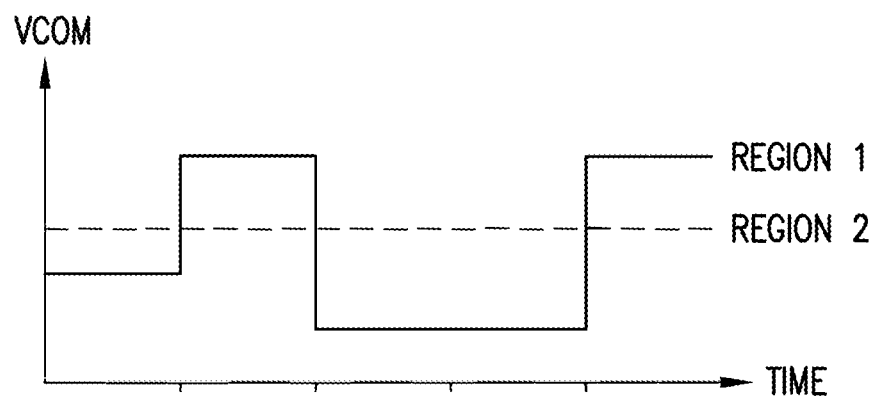
FIG. 4E illustrates examples of timing diagrams depicting adjusting voltages of modulators in accordance with the present invention.
Figure 4E:
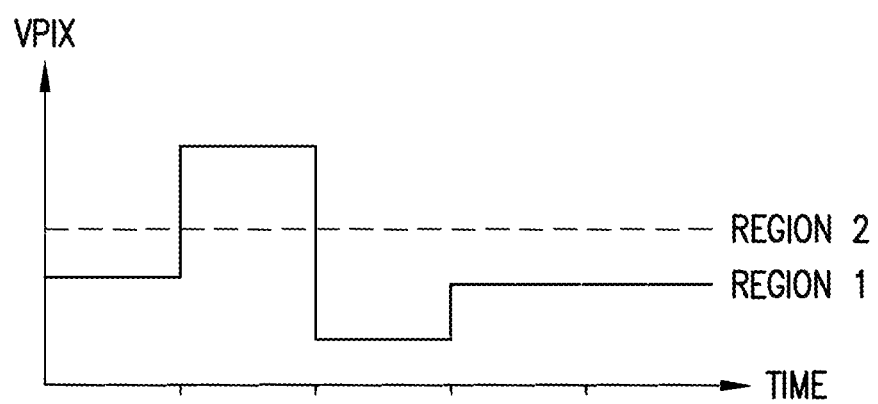

In an embodiment of the present invention, as shown in FIG. 4E, a VPIX voltage delivered to one region 16,18,20 at a particular instance in time may differ from a VPIX voltage delivered to a second region 16,18,20. Similarly, as shown in FIG. 4E, the VCOM voltage delivered to one region 16,18,20, in an embodiment of the present invention, may differ from the VCOM voltage applied to a second region 16,18,20 at a particular instance in time. In an embodiment of the present invention, VPIX and VCOM may, for example, both vary, such that a constant LC voltage is maintained.

Figure 5:
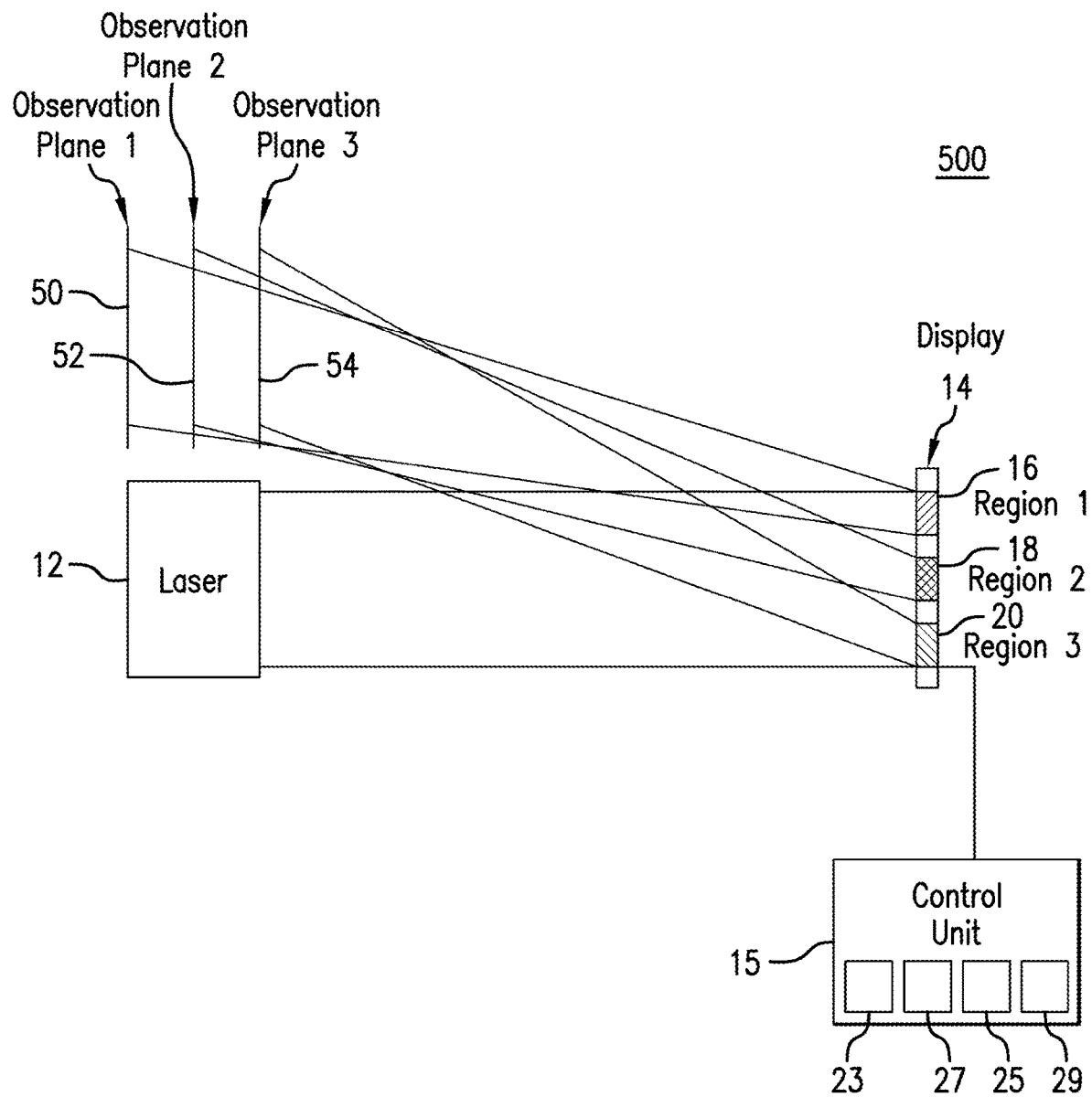
FIG. 5 illustrates an imaging system in accordance with the present invention.

In an embodiment of an imaging system 500, in accordance with the present invention, as shown in FIG. 5, phase modulated electromagnetic radiation, for example, light, is output to two or more observation planes 50,52,54 (real or imaginary) that are at different depths (e.g., positions or locations). For example, in an embodiment of an imaging system 500, in accordance with the present invention, as shown in FIG. 5, phase modulated light from each region 16,18,20 is output onto a different observation plane 50,52, 54, for example, a plane in space (real or imaginary) and/or a surface of an object. For example, in an embodiment of an imaging system 500, in accordance with the present invention, one or more sources 12 of electromagnetic radiation (e.g., light) outputs electromagnetic radiation, for example, light, onto two or more regions 16,18,20 of the modulator 14, at one or more instances in time, and such electromagnetic radiation (e.g., light) may be utilized to generate a 3D, pseudo 3D hologram, or pseudo hologram image of a single color or multiple colors. For example, in an embodiment of the present invention, a single source of electromagnetic radiation 12, for example light may be received at a modulator 14 that is segmented into two or more regions (e.g., three regions 16,18,20) and each region 16,18,20 of the modulator 14 outputs, reflects, creates, and/or transmits the phase modulated light (i.e., light that corresponds to an image) to at least two different observation planes (e.g., three observation planes 50,52,54). For example, in an embodiment of the present invention, as shown in FIG. 5, a first region 16 of the modulator 14 may reflect, create, and/or transmit phase modulated light (i.e., light corresponding to an image) to a first observation plane 50, and a second region 18 of the modulator 14 may output, reflect, create, and/or transmit phase modulated light (i.e., light corresponding to an image) to a second observation plane 52, and a third region 20 of the modulator 14 may output, reflect, create, and/or transmit phase modulated light (i.e., light corresponding to an image) to a third observation plane 54. In an embodiment of the present invention, a 3D, pseudo 3D, hologram, or pseudo 3D hologram may be generated from, for example, phase modulated light output from two segments (e.g., from regions 16,18,20) or three segments (e.g., from regions 16,18,20) of a modulator 14, in accordance with the present invention. In an embodiment of the present invention, a modulator 14, in accordance with the present invention, may be a reflective modulator or display, a transmissive modulator, or a modulator that has both transmissive and reflective display functions.

In an embodiment of an imaging system in accordance with the present invention, as shown in FIG. 5, the imaging system 500 is utilized to generate, for example, a spatially multiplexed 3D or pseudo 3D hologram based image. In an embodiment of the present invention, one or more source of lights (for example, one light source as shown in FIG. 5, or three light sources as shown in FIG. 1) 12 may generate one or more than one color of light and each region 16,18,20 of the modulator 14 may output a colored image (of a same color or different colors) at different times onto different ones of the observation planes 50,52,54 that result in an appearance of a 3D, pseudo 3D, hologram, or pseudo 3D hologram based image to, for example, a viewer of the a 3D, pseudo 3D, hologram, or pseudo 3D hologram image. It should be understood by one of ordinary skill in the art that the number of sources of electromagnetic radiation (e.g., light) 12 may vary. In an embodiment of the present invention, there may be, for example, two or more light sources 12a,12b,12c, as shown in FIG. 1A.

In an embodiment of an imaging system 500, in accordance with the present invention, when a light source 12 is utilized that generates electromagnetic radiation (e.g., light) of approximately one wavelength (i.e., light corresponding to a single color), a 3D, pseudo 3D, hologram, or pseudo 3D hologram image may be output that is of a single color. In an embodiment of the present invention, where one or more light sources 12,12a,12b,12c output electromagnetic radiation of more than one wavelength (e.g., more than one color of light), a multicolor 3D, pseudo 3D, hologram, or pseudo 3D hologram image may be generated by a modulator 14 in accordance with the present invention. In an embodiment of the present invention, as shown in FIG. 5, a source of electromagnetic radiation 12 may be a visible light source, for example, a laser.

Shown in FIGS. 2, 3, and 4A-D are examples of embodiments of a segmented or divided modulator 14 that may be utilized to create a 3D or pseudo 3D, hologram, or pseudo hologram of a same color or multiple colors. In an embodiment of the present invention, the electromagnetic radiation modulator 14 (e.g., a light modulator device), in accordance with the present invention, which forms or creates a 3D, pseudo 3D, pseudo hologram, or hologram same or multicolor image, may be a phase-only light modulator. In an embodiment of the present invention, a modulator 14 is any modulator or display that modulates phase of incoming electromagnetic radiation (e.g., light), and may be, for example, a phase-only liquid crystal on silicon (LCOS) spatial light modulator. In other embodiments, the phase modulating functions of a modulator 14, having both phase and amplitude modulating and/or image-forming functionality, may be utilized. In embodiments of the present invention, as shown in FIGS. 2 and 3, a modulator 14, in accordance with the present invention, may be segmented into two or more regions 16,18,20, for example, two or more same or different sized regions. Through spatial multiplexing, image combining, and/or temporal multiplexing (i.e., combining images that are generated at different points in time), embodiments of the present invention reduce the number of displays, e.g., spatial light modulators and associated parts needed to produce a color, 3D image, hologram, pseudo hologram, and/or pseudo 3D image using displays, e.g., displays that modify the phase of electromagnetic radiation (e.g., light).

Figure 7:
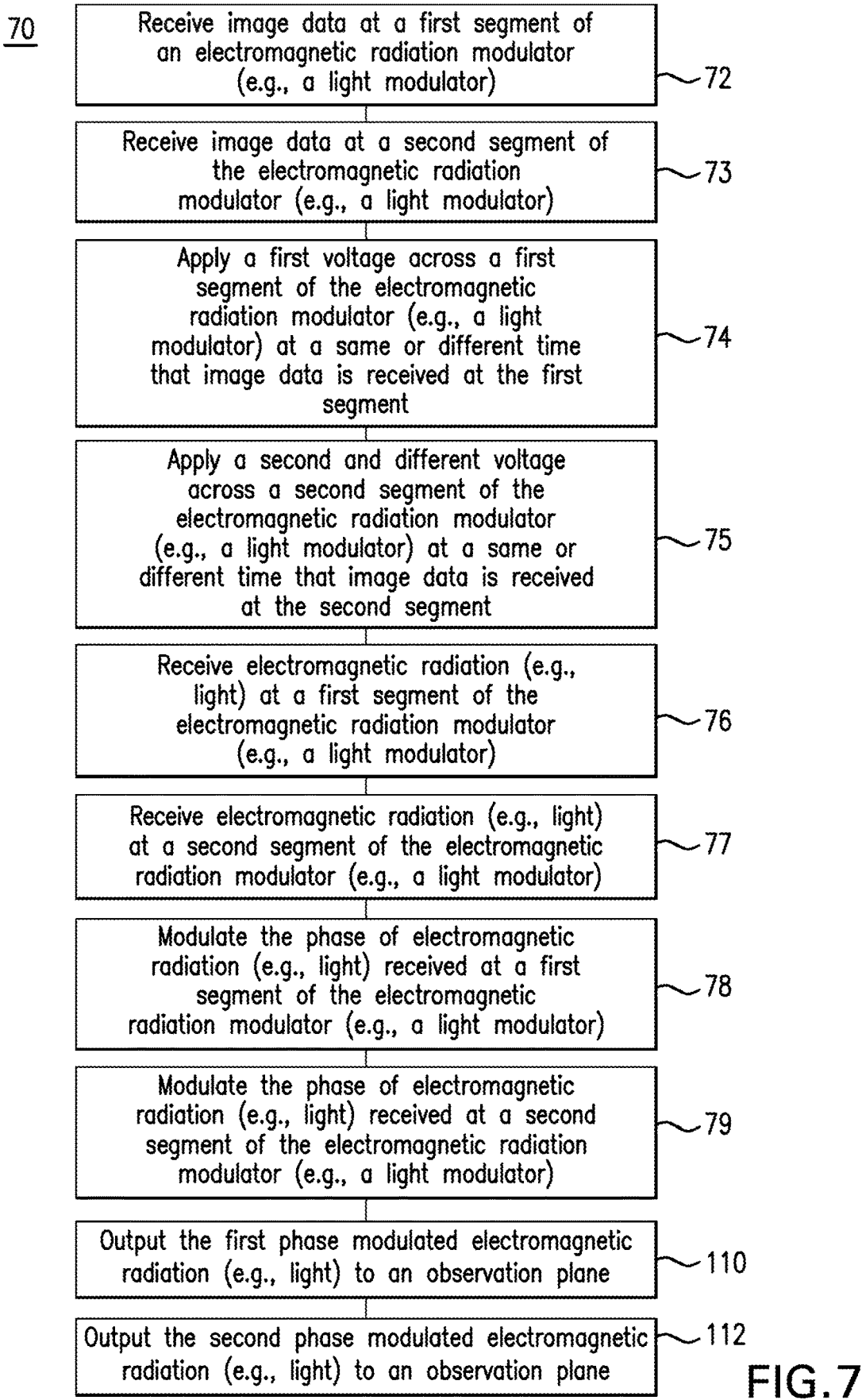
FIG. 7 illustrates a method in accordance with the present invention.

FIG. 7 illustrates a method of generating an image (e.g., a color image and/or hologram image) 70, in accordance with the present invention. A method 70, in accordance with the present invention, may involve, one or more of the following steps, and the order of the one or more steps may vary. A method 70, in accordance with the present invention, may involve in step 72, receiving at a first segment 16,18,20 image data for example, image data sent over, for example, lines DATA1, DATA2, and DATA3, respectively, from, for example, a control unit 15. A method 70, in accordance with the present invention, may involve in step 73, receiving at a second segment 16,18,20 image data for example, image data sent over, for example, lines DATA1, DATA2, and DATA3, respectively, from, for example, a control unit 15. A method 70, in accordance with the present invention, may involve, in step 74, applying a first voltage (e.g., VCOM1, VCOM2, VCOM3) across the first segment 16,18,20 of a light modulator 14, in accordance with the present invention at a same or different time as the first segment 16,18,20 receives image data corresponding to data sent over lines DATA1, DATA2, and DATA3 (and also referred to as DATA1, DATA2, DATA3, respectively) from, for example control unit 15. A method 70, in accordance with the present invention, may involve, in step 75, applying a second voltage and different voltage (e.g., VCOM1, VCOM2, VCOM3) across the second segment 16,18,20 of a light modulator 14, in accordance with the present invention at a same or different time as the segment 16,18,20 receives image data corresponding to data sent over lines DATA1, DATA2, and DATA3 (and also referred to as DATA1, DATA2, DATA3, respectively) from, for example control unit 15. In an embodiment of the present invention one of more voltages, for example, VCOM1, VCOM2, VCOM3 may be applied to respective segments 16,18,20 of the modulator 14 at a same or substantially same time, as the respective one or more segments 16,18,20 receive image data corresponding to data sent over, for example, data lines DATA1, DATA2, DATA3, corresponding to the respective regions 16,18,20 of a modulator 14, in accordance with the present invention. A method 70, in accordance with the present invention, may involve, in step 76, receiving electromagnetic radiation (e.g., light) from one or more sources of electromagnetic radiation (e.g., light) 12,12a,12b,12c at the first segment 16,18,20, via a modulator 14, in accordance with the present invention. A method 70, in accordance with the present invention, may involve, in step 77, receiving electromagnetic radiation (e.g., light) from one or more sources of electromagnetic radiation (e.g., light) 12,12a,12b, 12c at the second segment 16,18,20, via a modulator 14, in accordance with the present invention. A method 70, in accordance with the present invention, may involve, in step 78 modulating a phase of electromagnetic radiation (e.g., light) from one or more sources of electromagnetic radiation (e.g., light) 12,12a,12b,12c by the first segment 16,18,20, via a modulator 14, in accordance with the present invention, and generating first phase modulated electromagnetic radiation (e.g., light). A method 70, in accordance with the present invention, may involve, in step 79 modulating a phase of electromagnetic radiation (e.g., light) from one or more sources of electromagnetic radiation (e.g., light) 12,12a,12b,12c by the second segment 16,18,20, via a modulator 14, in accordance with the present invention, and generating first phase modulated electromagnetic radiation (e.g., light). A method 70, in accordance with the present invention, may involve, receiving electromagnetic radiation (e.g., light) from one or more sources of electromagnetic radiation (e.g., light) 12,12a,12b,12c by at least the first and second segments 16,18,20, of a modulator 14, in accordance with the present invention, at a same time or different times. In an embodiment of a method 70, in accordance with the present invention, electromagnetic radiation (e.g., light) may be received and/or modulated (e.g., phase modulated) by each segment 16,18,20 at approximately the same time an image (e.g., via image data) is written to each segment 16,18,20 or subsequent to the writing of an image (e.g., image data) to each segment 16,18,20. A method 70, in accordance with the present invention, may involve, in step 110, outputting the first phase modulated light to an observation plane; and in step 112, outputting the second phase modulated light to the observation plane, and thereby creating an image (e.g., a 2D image, a 3D image, a pseudo 3D image, a color image, a hologram, and/or a pseudo hologram image) at the observation plane 19. One or more of the steps described in the method 70, in accordance with the present invention may be repeated when a modulator 14, in accordance with the present invention, has more than two segments.

Figure 8:
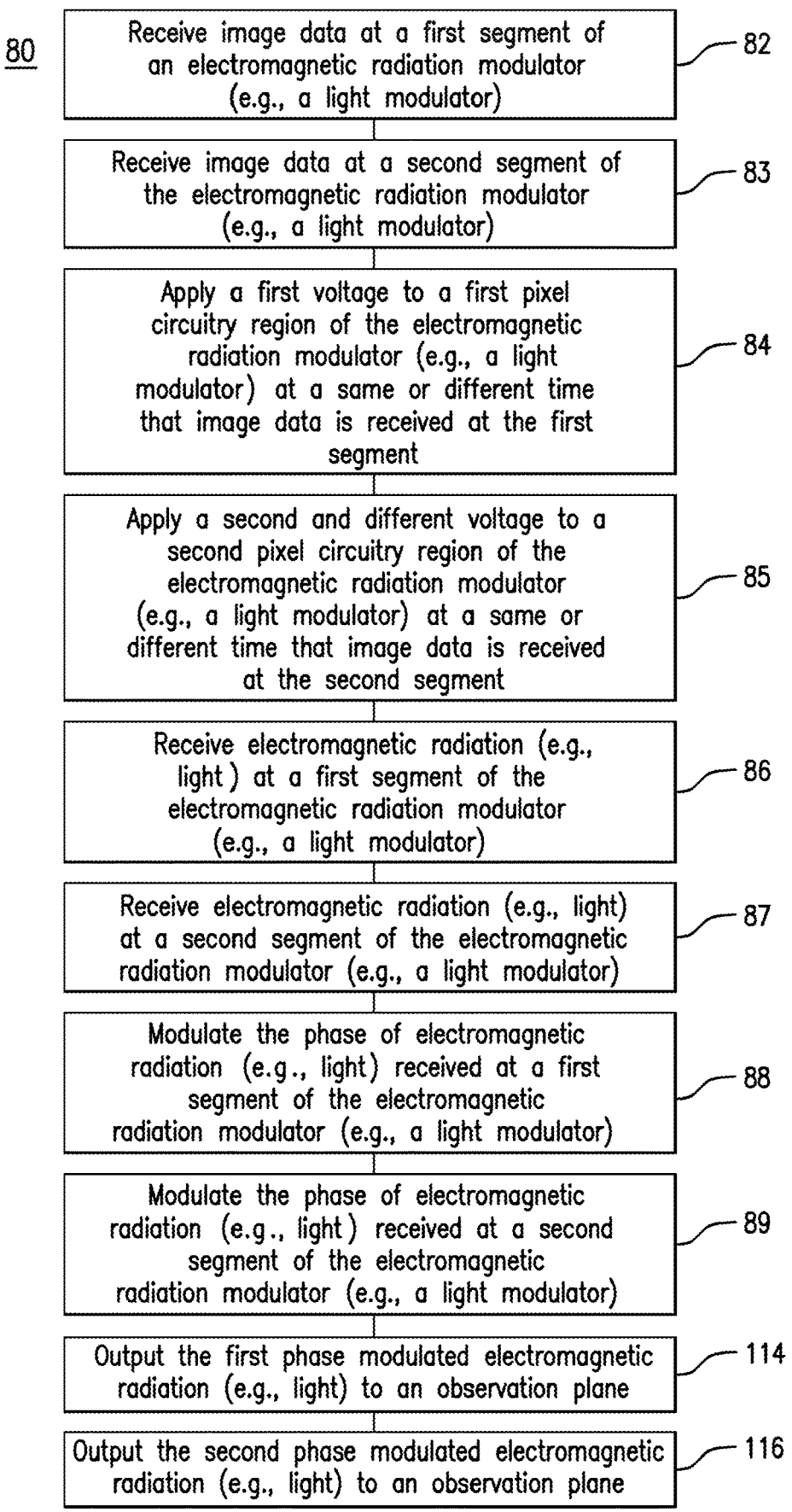
FIG. 8 illustrates a method in accordance with the present invention.

FIG. 8 illustrates a method of generating an image (e.g., a color image, 2D image, 3D image, pseudo 3D image, hologram, and/or pseudo hologram image) 80, in accordance with the present invention. A method 80, in accordance with the present invention, may involve, one or more of the following steps, and the order of the one or more steps may vary. A method 80, in accordance with the present invention, may involve in step 82, receiving at a first segment 16,18,20 image data for example, image data sent over, for example, lines DATA1, DATA2, and DATA3, respectively, from, for example, a control unit 15. A method 80, in accordance with the present invention, may involve in step 83, receiving at a second segment 16,18,20 image data for example, image data sent over, for example, lines DATA1, DATA2, and DATA3, respectively, from, for example, a control unit 15. A method 80, in accordance with the present invention, may involve, in step 84, applying a first voltage (e.g., VPIX1, VPIX2, VPIX3, respectively) to a first pixel circuitry region 25a,25b,25c, corresponding to segment 16,18,20, respectively, of a modulator 14, in accordance with the present invention at a same or different time as the first segment 16,18,20 receives image data corresponding to data sent over lines DATA1, DATA2, and DATA3 (and also referred to as DATA1, DATA2, DATA3, respectively) from, for example control unit 15. A method 80, in accordance with the present invention, may involve, in step 85, applying a second voltage and different voltage (e.g., VPIX1, VPIX2, VPIX3, respectively) to a second pixel circuitry region 25a,25b,25c, corresponding to segment 16,18,20, respectively, of a modulator 14, in accordance with the present invention at a same or different time as the first segment 16,18,20 receives image data corresponding to data sent over lines DATA1, DATA2, and DATA3 (and also referred to as DATA1, DATA2, DATA3, respectively) from, for example control unit 15. In an embodiment of a method 80, in accordance with the present invention, a voltage (e.g., VPIX1, VPIX2, VPIX3) may be applied to a pixel circuitry region 25a,25b,25c, corresponding to a first segment 16,18, 20 of a light modulator 14, in accordance with the present invention at a same or different time as the segment 16,18,20 receives image data corresponding to data sent over lines DATA1, DATA2, and DATA3 (and also referred to as DATA1, DATA2, DATA3, respectively) from, for example control unit 15. In an embodiment of the present invention one of more voltages, for example, VPIX1, VPIX2, VPIX3 may be applied to respective pixel circuitry regions 25a, 25b,25c, corresponding to segments 16,18,20 of the modulator 14, respectively, at a same or substantially same time, as the respective one or more segments 16,18,20 receive image data corresponding to data sent over, for example, data lines DATA1, DATA2, DATA3 that correspond to the respective regions 16,18,20 of a modulator 14, in accordance with the present invention. A method 80, in accordance with the present invention, may involve, in step 86, receiving electromagnetic radiation (e.g., light) from one or more sources of electromagnetic radiation (e.g., light) 12,12a,12b,12c at the first segment 16,18,20, via a modulator 14, in accordance with the present invention. A method 80, in accordance with the present invention, may involve, in step 87, receiving electromagnetic radiation (e.g., light) from one or more sources of electromagnetic radiation (e.g., light) 12,12a,12b,12c at the second segment 16,18,20, via a modulator 14, in accordance with the present invention. A method 80, in accordance with the present invention, may involve, in step 88 modulating electromagnetic radiation (e.g., light) (e.g., modulating a phase of the electromagnetic radiation, e.g., light) from one or more sources of electromagnetic radiation (e.g., light) 12,12a,12b,12c by the first segment 16,18,20, via a modulator 14, in accordance with the present invention. A method 80, in accordance with the present invention, may involve, in step 89 modulating electromagnetic radiation (e.g., light) (e.g., modulating a phase of the electromagnetic radiation, e.g., light) from one or more sources of electromagnetic radiation (e.g., light) 12,12a,12b,12c by the second segment 16,18,20, via a modulator 14, in accordance with the present invention. A method 80, in accordance with the present invention, may involve, receiving electromagnetic radiation (e.g., light) from one or more sources of electromagnetic radiation (e.g., light) 12,12a,12b,12c by at least the first and second segments 16,18,20, of a modulator 14, in accordance with the present invention, at a same time or different times. In an embodiment of a method 80, in accordance with the present invention, electromagnetic radiation (e.g., light) may be received and/or modulated by each segment 16,18,20 at approximately the same time an image (e.g., via image data) is written to each segment 16,18,20 or subsequent to the writing of an image (e.g., image data) to each segment 16,18,20. A method 80, in accordance with the present invention, may involve, in step 114, outputting the first phase modulated light to an observation plane; and in step 116, outputting the second phase modulated light to the observation plane. One or more of the steps described in the method 80, in accordance with the present invention may be repeated when a modulator 14, in accordance with the present invention, has more than two segments. It should also be understood by one of ordinary skill in the art that the number of VCOM voltages, VPIX voltages, data lines, and sets of data (e.g., data) sent to segments of a modulator 14, in accordance with the present invention, may vary.

Figure 9:
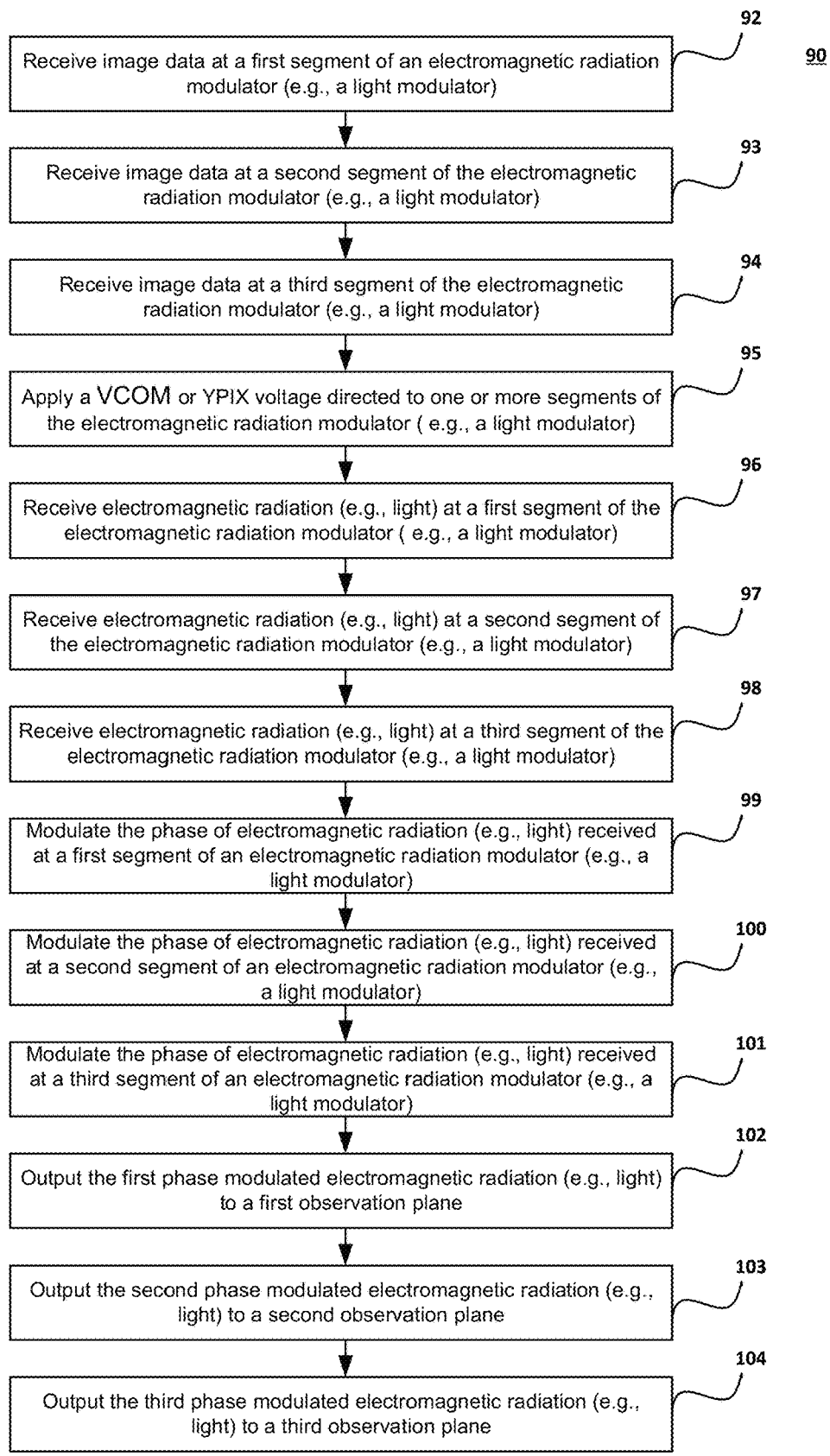
FIG. 9 illustrates a method in accordance with the present invention.

FIG. 9 illustrates a method of generating an image (e.g., a color image, 2D image, 3D image, pseudo 3D image, hologram, and/or pseudo hologram) 90, in accordance with the present invention. A method 90, in accordance with the present invention, may involve, one or more of the following steps, and the order of the one or more steps may vary. A method 90, in accordance with the present invention, may involve in step 92, receiving at a first segment 16,18,20 image data for example, image data sent over, for example, lines DATA1, DATA2, and DATA3, respectively, from, for example, a control unit 15. A method 90, in accordance with the present invention, may involve in step 93, receiving at a second segment 16,18,20 image data for example, image data sent over, for example, lines DATA1, DATA2, and DATA3, respectively, from, for example, a control unit 15. A method 90, in accordance with the present invention, may involve in step 94, receiving at a third segment 16,18,20 image data for example, image data sent over, for example, lines DATA1, DATA2, and DATA3, respectively, from, for example, a control unit 15. A method 90, in accordance with the present invention, may involve, in step 95, applying one or more voltages to a modulator 14, in accordance with the present invention, via, for example, applying a single VCOM voltage to a conducting layer 30, a VCOM voltage, applying a VCOM voltage to at least two voltage regions (for example, applying VCOM1,VCOM2,VCOM3 to voltage regions 34,36,38 corresponding to regions 16,18,20, respectively) and/or applying multiple voltages to pixel elements or pixel circuitry regions (e.g., applying VPIX1, VPIX2,VPIX3 to pixel to pixel circuitry regions 25a,25b, 25c, corresponding to regions 16,18,20, respectively) at a same or different time as, for example, a corresponding segment 16,18,20 receives image data corresponding to data sent over lines DATA1, DATA2, and DATA3 (and also referred to as DATA1, DATA2, DATA3, respectively) from, for example control unit 15, or at a same or different time as another segment, for example, segment 16,18,20 receives, for example, a VPIX and/or VCOM voltage. A method 90, in accordance with the present invention, may involve, in step 96, receiving electromagnetic radiation (e.g., light) from one or more sources of electromagnetic radiation (e.g., light) 12,12a,12b,12c at the first segment 16,18,20 of a modulator 14, in accordance with the present invention. A method 90, in accordance with the present invention, may involve, in step 97, receiving electromagnetic radiation (e.g., light) from one or more sources of electromagnetic radiation (e.g., light) 12,12a,12b,12c at the second segment 16,18,20, via a modulator 14, in accordance with the present invention, at a same or different time electromagnetic radiation (e.g., light) is received by another segment, for example, segment 16,18,20 of the modulator 14. A method 90, in accordance with the present invention, may involve, in step 98, receiving electromagnetic radiation (e.g., light) from one or more sources of electromagnetic radiation (e.g., light) 12,12a,12b,12c at the third segment 16,18,20, via a modulator 14, in accordance with the present invention, at a same or different time electromagnetic radiation (e.g., light) is received by another segment, for example, segment 16,18,20 of the modulator 14. A method 90, in accordance with the present invention, may involve, in step 99 modulating electromagnetic radiation (e.g., light) from one or more sources of electromagnetic radiation (e.g., light) 12,12a,12b, 12c (e.g., modulating a phase of the electromagnetic radiation, e.g., light) by the first segment 16,18,20, via a modulator 14, in accordance with the present invention. A method 90, in accordance with the present invention, may involve, in step 100 modulating electromagnetic radiation (e.g., light) from one or more sources of electromagnetic radiation (e.g., light) 12,12a,12b,12c (e.g., modulating a phase of the electromagnetic radiation, e.g., light) by the second segment 16,18,20, via a modulator 14, in accordance with the present invention, at a same or different time electromagnetic radiation (e.g., light) is modulated by another segment, for example, segment 16,18,20 of the modulator 14. A method 90, in accordance with the present invention, may involve, in step 101 modulating electromagnetic radiation (e.g., light) from one or more sources of electromagnetic radiation (e.g., light) 12,12a,12b,12c (e.g., modulating a phase of the electromagnetic radiation, e.g., light) by the third segment 16,18,20, via a modulator 14, in accordance with the present invention, at a same or different time electromagnetic radiation (e.g., light) is modulated by another segment, for example, segment 16,18,20 of the modulator 14. A method 90, in accordance with the present invention, may involve, in step 102, outputting the first phase modulated light to a first observation plane; and in step 103, outputting the second phase modulated light to a second observation plane; and in step 104, outputting the third phase modulated light to a third observation plane at a same or different time that modulated electromagnetic radiation (e.g., light) is output by another segment, for example, segment 16,18,20 of the modulator 14. In an embodiment of the method 90, in accordance with the present invention, first phase modulated light output to the first observation plane, second phase modulated light output to a second observation plane form a 3D, pseudo 3D, hologram, pseudo hologram, pseudo holographic, and/or holographic image. In an embodiment of the method 90, in accordance with the present invention, first phase modulated light output to the first observation plane, second phase modulated light output to a second observation plane, and third phase modulated light output to a third observation plane form a 3D, pseudo 3D, hologram, pseudo hologram, pseudo holographic, and/or holographic image. In an embodiment of the present invention the modulator 14 may have more than two regions or segments. It should also be understood by one of ordinary skill in the art that the number of VCOM voltages, VPIX voltages, data lines, and sets of data (e.g., data) sent to segments of a modulator 14, in accordance with the present invention, may vary.

As shown in FIGS. 1 and 5, an imaging system 10,500, in accordance with the present invention, may also include a control unit and/or system 15 that addresses one or more pixels of a modulator 14 and/or modulates the phase of the beamlets (e.g., beamlets of light) corresponding to the one or more pixels 23 of the modulator 14. The control unit 15 may include and/or be coupled to a software module 23, processor 25, storage device 27 (which stores, for example, bit plane data, other image or pixel data, timing data, voltage data, etc.), and/or a timing device 29 (which controls, for example, the timing of VCOM and/or VPIX voltages applied to regions of the modulator 14 in accordance with the present invention (e.g., regions 16,18,20) and the timing of data (e.g., DATA1, DATA2, and DATA 3) sent to a modulator 14 in accordance with the present invention, and may be utilized to determine and/or control or determine the phase of the electromagnetic radiation (e.g., light beamlets) 17 emitted or output from the modulator 14 and/or independently, individually, and separately control the a single voltage VCOM across a conducting layer 30 of modulator 14, and/or control multiple VCOM and/or VPIX voltages (e.g., VCOM1, VCOM2, VCOM3, VPIX1, VPIX2, VPIX3) across two or more regions 16,18,20 of a modulator 14, in accordance with the present invention. In an embodiment of the present invention, the control unit 15 may be coupled to the light modulator 14, for example, electrically via a wireless connection, wireline connection, and/or optical connection (e.g. via a laser beam, infrared light, or fiber optic), and may, for example, control, induce, and/or be determinative of a phase of electromagnetic radiation (e.g., light) received at a modulator 14, in accordance with the present invention, or control, induce, and/or be determinative of relative phase shifts between all or some of the electromagnetic radiation (e.g., adjacent beamlets of light) received by pixels (e.g., adjacent pixels) of the modulator 14, and subsequently modulated by the modulator 14.

Figure 6:
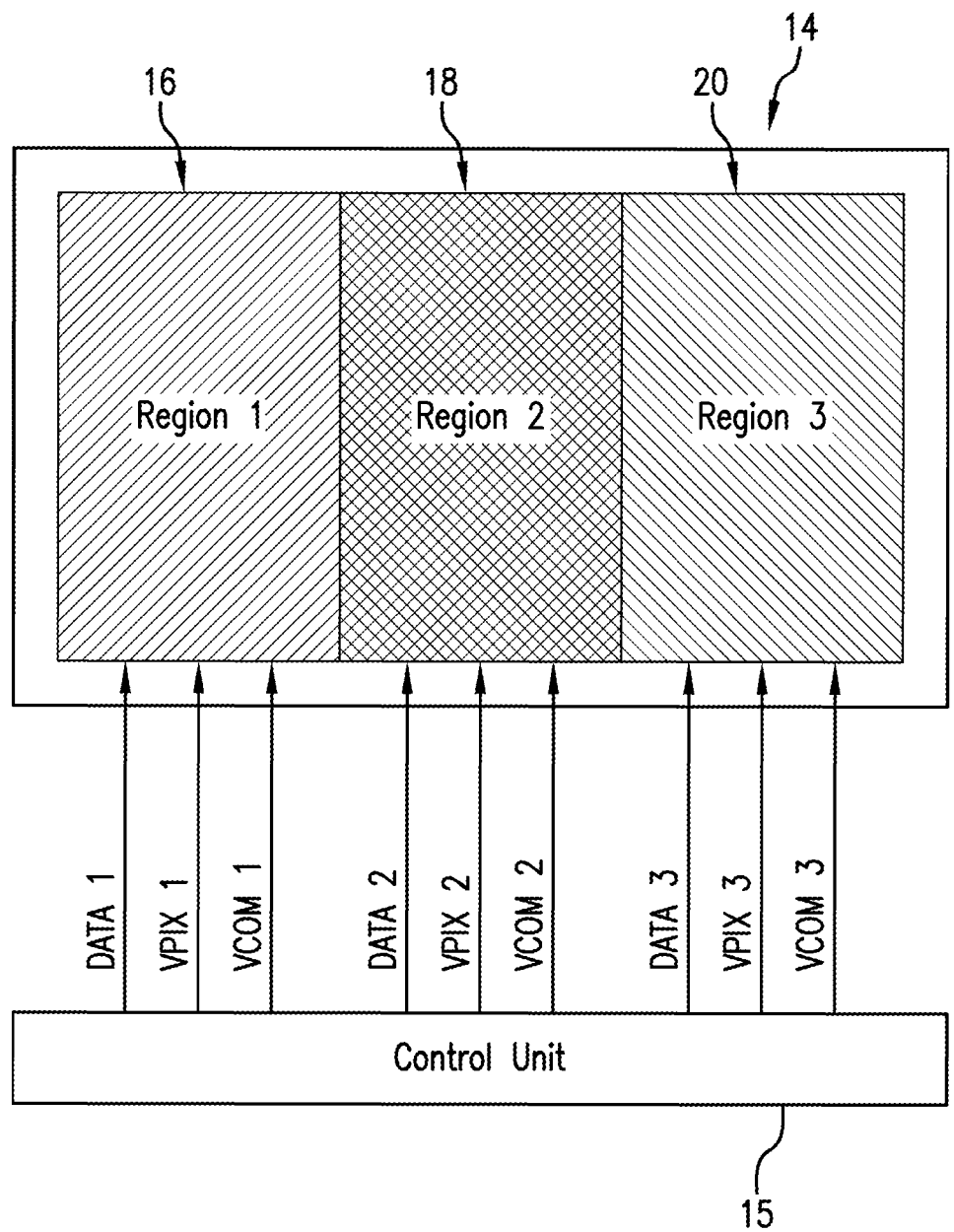
FIG. 6 illustrates an imaging system in accordance with the present invention.

As shown in FIG. 6, a control unit 15 may control the data (e.g., bit plane data or other image data) sent to a region 16,18,20 of a modulator 14, in accordance with the present invention (e.g., the modulators 14 shown in FIGS. 1-5), and such data is referred to as, for example, DATA1, DATA2, and DATA3, respectively. As shown in FIG. 6, a control unit 15 may control the voltage to pixel circuitry of corresponding to regions 16,18,20, and referred to as, for example, VPIX1, VPIX2, VPIX3, respectively; and/or control the voltage applied to conducting layer 30 of a region 16,18,20, and referred to as, for example, VCOM (where the modulator 14 has a single conducting layer), VCOM1, VCOM2, and VCOM3, respectively.

As described above, control unit 15 may include a software module 23 may include logic that is executed by processor 25. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage 27, including, for example, random access memory (RAM), read-only memories (ROM), erasable/ electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, other commercially available processors and/or or other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future. A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques. System memory may include any of a variety of known or future memory storage devices that can be used to store the desired information and that can be accessed by a computer. Computer readable storage media may include non-transitory volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, and/or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications. Computers or processors may be part of a network. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet. Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Each region 16,18,20, for example, of a modulator 14, in accordance with the present invention, may each modulate a different wavelength of electromagnetic radiation, for example, each region may modulate a different color of light. An imaging system 10,500, in accordance with the present invention may, for example, be a spatially multiplexed color holographic display. Through spatial multiplexing or the combining of multiple images via a segmented modulator 14, in accordance with the present invention, the number of spatial light modulators and associated parts needed to reproduce a color image, hologram and/or pseudo hologram using phase displays is reduced. An imaging system 10,500, in accordance with the present invention, lowers costs of generating an image, for example, a color image or hologram, by reducing a component count and product size. An imaging system 10,500, in accordance with the present invention, includes a display (e.g., a liquid crystal on silicon display (LCOS) display).

In imaging system 10,500, or components of an imaging system 10,500 and methods, in accordance with the present invention, may be utilized in products such as, but not limited to, projectors, televisions, computer monitors, near-eye displays, heads-up displays, augmented reality displays, virtual reality displays, or mixed reality displays. In an embodiment of the present invention, a modulator 14 (e.g., a spatially multiplexed color holographic display), in accordance with the present invention, utilizes, for example, a red, green, and blue laser, in conjunction with an LCOS (liquid crystal on silicon) microdisplay that performs phase modulation and forms an image at an observation plane 19 (that is real or imaginary). Through spatial multiplexing or the combining of images, a segmented modulator 14 or imaging system 10,500 including a segmented modulator 14, in accordance with the present invention, which performs spatial multiplexing or the combining of images (e.g., single or multicolor images), reduces a number modulators 14 and associated components (e.g., optic devices) needed to reproduce a color, pseudo 3D, 3D image, hologram, or pseudo hologram image using phase displays. Some non-limiting examples of the present invention include:

Example 1 includes an imaging system or device comprising: a spatial light modulator, wherein the spatial light modulator is divided into at least two regions; and a control unit coupled to the spatial light modulator, wherein the control unit controls a voltage across each of the at least two regions, and wherein the voltage across one of the at least two regions differs from the voltage across another of the at least two regions.

Example 2 includes the imaging system of claim 1, wherein the spatial light modulator modulates a phase of incoming light that is received at the spatial light modulator.

Example 3 includes the imaging system of claim 1, wherein the spatial light modulator comprises pixel elements, and wherein each of the pixel elements of each of the at least two regions of the spatial modulator are separately addressed by the control unit.

Example 4 includes the imaging system of claim 3, wherein the pixel elements of each of the at least two regions of the spatial modulator are simultaneously addressed by the control unit.

Example 5 includes the imaging system of claim 3, wherein the pixel elements corresponding to one of the at least two regions is a first pixel circuitry region, and wherein the pixel elements corresponding to another of the at least two circuitry regions is a second pixel circuitry region, and wherein the first pixel circuitry region and the second pixel circuitry region are sequentially addressed by the control unit.

Example 6 includes the imaging system of claim 5, wherein the first pixel circuitry region is addressed at a time that is different from when the second pixel circuitry region is addressed.

Example 7 includes the imaging system of claim 5, wherein a first set of bit plane data is received at the first pixel circuitry region of one of the at least two regions, and wherein a second set of bit plane data is received at the second pixel circuitry region of the another of the at least two regions.

Example 8 includes the imaging system of claim 1, wherein at least one of the at least two regions differs in size from another of the at least two regions.

Example 9 includes the imaging system of claim 1, wherein each of the at least two regions of the spatial light modulator modulates a phase of incoming light that is received at each of the at least two regions.

Example 10 includes the imaging system of claim 9, wherein at least one of the at least two regions of the spatial light modulator receives incoming light of a wavelength that is different from a wavelength of light received at another one of the at least two regions.

Example 11 includes the imaging system of claim 1, wherein the spatial light modulator is a phase-only spatial light modulator.

Example 12 includes the imaging system of claim 1, wherein each of the at least two regions of the spatial light modulator comprises a liquid crystal material that differs from the liquid crystal material of another one of the at least two regions.

Example 13 includes a method of generating an image, comprising: receiving image data at a first region of a light modulator; receiving image data at a second region of a light modulator; receiving light at a first region of a light modulator; receiving light at a second region of a light modulator; modulating a phase of the light received at the first region, and generating first phase modulated light; modulating a phase of the light received at the second region, and generating second phase modulated light.

Example 14 includes the method of claim 13, further comprising: outputting the first phase modulated light to a first observation plane; and outputting the second phase modulated light to a second observation plane.

Example 15 includes the method of claim 14, wherein the first phase modulated light is combined with the second phase modulated light forming a single image.

Example 16 includes the method of claim 14, further comprising: receiving light at a third region of a display; modulating a phase of the light at the third region and generating third phase modulated light; and outputting the third phase modulated light to a third observation plane.

Example 17 includes the method of claim 16, wherein the third phase modulated light is combined with the first phase modulated light and the second phase modulated light and a combined image is generated.

Example 18 includes the method of claim 17, wherein the combined image is a hologram image.

Example 19 includes the method of claim 16, wherein the light received at the first region is red light, wherein the light received at the second region is green light, and wherein the light received at the third region is blue light.

Example 20 includes the imaging system of claim 1, wherein one of the at least two regions of the spatial light modulator comprises a cell gap that differs in size from a cell gap of another of the at least two regions.

Although certain embodiments and examples have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof. It will be apparent those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An imaging system, comprising:
a reflective LCOS display forming a spatial light modulator, wherein the spatial light modulator is divided into at least two regions, each of the at least two regions including an array of pixels and wherein the spatial light modulator modulates a phase of incoming light that is received at the spatial light modulator, and wherein the spatial light modulator is a phase-only spatial light modulator that modulates a phase and not an amplitude of the incoming light, a first region of the at least two regions of the spatial light modulator having a first liquid crystal cell gap that differs in size from a second liquid crystal cell gap of a second region of the at least two regions, such that:
a path of first light of a first color reflected from the first region traverses the first liquid crystal cell gap twice, thereby applying a first amount of phase modulation to the first light; and
a path of second light of a second color, different from the first color, reflected from the second region traverses the second liquid crystal cell gap twice, thereby applying a second amount of phase modulation, different from the first amount, to the second light; and
a control unit coupled to the spatial light modulator, wherein the control unit controls a voltage across the array of pixels of each of the at least two regions, and wherein the voltage across the array of pixels of the first region differs from the voltage across the array of pixels of the second region, the control unit controlling the voltage across the array of pixels of the first region to output an image of the first color at a different time from a time when the control unit controls the voltage across the array of pixels of the second region to output an image of the second color.

2. The imaging system of claim 1, wherein the spatial light modulator comprises pixel elements, and wherein each of the pixel elements of each of the at least two regions of the spatial light modulator are at least one of separately addressed by the control unit or simultaneously addressed by the control unit.

3. The imaging system of claim 2, wherein the pixel elements corresponding to the first region is a first pixel circuitry region, and wherein the pixel elements corresponding to the second region is a second pixel circuitry region, and wherein the first pixel circuitry region and the second pixel circuitry region are sequentially addressed by the control unit.

4. The imaging system of claim 3, wherein the first pixel circuitry region is addressed at a time that is different from when the second pixel circuitry region is addressed.

5. The imaging system of claim 3, wherein a first set of bit plane data is received at the first pixel circuitry region of the first region, and wherein a second set of bit plane data is received at the second pixel circuitry region of the second region.

6. The imaging system of claim 1, wherein the first region differs in size from the second region.

7. The imaging system of claim 1, wherein at least one of the at least two regions of the spatial light modulator receives incoming light of a wavelength that is different from a wavelength of light received at another one of the at least two regions.

8. The imaging system of claim 1, wherein the first region of the spatial light modulator comprises a liquid crystal material that differs from the liquid crystal material of the second region.

9. A method of generating an image, comprising:
receiving image data at a first region of a light modulator, wherein the light modulator is a phase-only spatial light modulator formed by a reflective LCOS display and the first region includes a first array of pixels;
receiving image data at a second region of the light modulator, the second region including a second array of pixels, the second region having a second cell gap that differs in size from a first cell gap of the first region;
receiving first light of a first color at the first region of the light modulator;
receiving second light of a second color, different from the first color, at the second region of the light modulator;
modulating a phase of the light received at the first region and generating first phase modulated light at a first time, the modulating including providing a first voltage across the first array of pixels, the first light having a path traversing the first cell gap twice, thereby applying a first amount of phase modulation to the first light to generate the first phase modulated light; and
modulating a phase of the light received at the second region and generating second phase modulated light at a second time different from the first time, the modulating including providing a second voltage across the second array of pixels where the second voltage is different from the first voltage, the second light having a path traversing the second cell gap twice, thereby applying a second amount of phase modulation, different from the first amount, to the second light to generate the second phase modulated light.

10. The method of claim 9, further comprising:
outputting the first phase modulated light to a first observation plane; and outputting the second phase modulated light to a second observation plane.

11. The method of claim 10, wherein the first phase modulated light is combined with the second phase modulated light forming a single image.

12. The method of claim 10, further comprising:
receiving third light at a third region of the display, the third region having a third cell gap that differs in size from the first cell gap of the first region and the second cell gap of the second region;
modulating a phase of the light at the third region and generating third phase modulated light; and
outputting the third phase modulated light to a third observation plane.

13. The method of claim 12, wherein the third phase modulated light is combined with the first phase modulated light and the second phase modulated light and a combined image is generated.

14. The method of claim 13, wherein the combined image is a hologram image.

15. The method of claim 12, wherein the first light received at the first region is red light, wherein the second light received at the second region is green light, and wherein the third light received at the third region is blue light.

16. The method of claim 12, wherein the first observation plane, the second observation plane and the third observation plane differ from each other.

17. An imaging system, comprising:
a reflective LCOS display forming a phase-only spatial light modulator, wherein the phase-only spatial light modulator is divided into at least two regions, each of the at least two regions including an array of pixels, a first region of the at least two regions of the spatial light modulator having a first cell gap that differs in size from a second cell gap of a second region of the at least two regions, and wherein the phase-only spatial light modulator modulates only a phase and not an amplitude of incoming coherent light that is received at each of the at least two regions of the phase-only spatial light modulator, such that:
a path of first light of a first color reflected from the first region traverses the first cell gap twice, thereby applying a first amount of phase modulation to the first light; and
a path of second light of a second color, different from the first color, reflected from the second region traverses the second cell gap twice, thereby applying a second amount of phase modulation, different from the first amount, to the second light; and
a control unit coupled to the phase-only spatial light modulator, wherein the control unit controls a voltage across the array of pixels of each of the at least two regions, and wherein the voltage across the array of pixels of the first region differs from the voltage across the array of pixels of the second region, the control unit controlling the voltage across the array of pixels of the first region to output an image of the first color at a different time from a time when the control unit controls the voltage across the array of pixels of the second region to output an image of the second color.

18. The imaging system of claim 17 further comprising at least two lasers, each laser to provide incoming coherent light to a respective one of the at least two regions.

19. The imaging system of claim 18, wherein the first light comprises the incoming coherent light provided to the first region, having a wavelength that is different from a wavelength of the second light, the second light comprising the incoming coherent light provided to the second region.

* * * * *